United States Patent
Guo et al.

(10) Patent No.: US 10,101,235 B2
(45) Date of Patent: Oct. 16, 2018

(54) METHOD TO DETERMINE THE UNBALANCE OF A ROTOR

(71) Applicants: Weijian Guo, Beijing (CN); Fang Jiang, Beijing (CN)

(72) Inventors: Weijian Guo, Beijing (CN); Fang Jiang, Beijing (CN)

(*) Notice: Subject to any disclaimer, the term of this patent is extended or adjusted under 35 U.S.C. 154(b) by 140 days.

(21) Appl. No.: 15/114,477

(22) PCT Filed: Nov. 17, 2014

(86) PCT No.: PCT/CN2014/091251
§ 371 (c)(1),
(2) Date: Jul. 27, 2016

(87) PCT Pub. No.: WO2015/113434
PCT Pub. Date: Aug. 6, 2015

(65) Prior Publication Data
US 2016/0349137 A1    Dec. 1, 2016

(30) Foreign Application Priority Data

Jan. 28, 2014    (CN) .......................... 2014 1 0042466

(51) Int. Cl.
| G01M 1/16 | (2006.01) |
| H02K 15/16 | (2006.01) |
| G01M 1/20 | (2006.01) |
| G01M 1/32 | (2006.01) |

(52) U.S. Cl.
CPC ............ *G01M 1/16* (2013.01); *H02K 15/165* (2013.01); *G01M 1/20* (2013.01); *G01M 1/32* (2013.01)

(58) Field of Classification Search
CPC ............ G01M 1/16; G01M 1/20; G01M 1/32; G01M 1/12; G01M 1/22
See application file for complete search history.

(56) References Cited

U.S. PATENT DOCUMENTS

| 4,345,472 A | 8/1982 | Hara et al. | |
| 4,424,711 A * | 1/1984 | Giers | G01M 1/02 73/1.14 |
| 4,854,168 A * | 8/1989 | Himmler | G01M 1/225 73/459 |

(Continued)

FOREIGN PATENT DOCUMENTS

| CN | 1673704 A | 9/2005 |
| CN | 1673711 A | 9/2005 |

(Continued)

OTHER PUBLICATIONS

English Translation of JP 2013-024705.*
(Continued)

*Primary Examiner* — Helen Kwok
(74) *Attorney, Agent, or Firm* — Maier & Maier, PLLC (57) ABSTRACT

A method to measure and determine the unbalance of a rotor, by decoupling the unbalance of the balancing machine and the unbalance of the rotor, which includes the following procedures make the zero angle reference on the rotor or on the balancing machine, select two planes on the rotor, and use a balancing machine to measure the unbalances of the rotor in the two planes, these unbalances are designated as first nominal unbalances.

5 Claims, 5 Drawing Sheets

(a)    (b)

(56) References Cited

U.S. PATENT DOCUMENTS

| | | | | |
|---|---|---|---|---|
| 5,140,534 A | * | 8/1992 | Miller | G01M 1/16 33/203.15 |
| 5,277,063 A | * | 1/1994 | Thomas | G01M 1/22 73/457 |
| 5,412,583 A | * | 5/1995 | Cameron | G01M 1/22 700/279 |
| 5,421,197 A | | 6/1995 | Ohms | |
| 5,450,337 A | * | 9/1995 | Chuan-Yuan | G01M 1/08 464/180 |
| 5,481,912 A | * | 1/1996 | Himmler | G01D 1/16 73/1.14 |
| 6,189,372 B1 | | 2/2001 | Danz | |
| 2006/0015270 A1 | * | 1/2006 | Tsuji | G01M 1/08 702/56 |
| 2006/0173652 A1 | * | 8/2006 | Abbotoy | G01M 1/00 702/179 |
| 2016/0349137 A1 | * | 12/2016 | Guo | H02K 15/165 |

FOREIGN PATENT DOCUMENTS

| | | |
|---|---|---|
| CN | 102072797 A | 5/2011 |
| CN | 203011629 U | 6/2013 |
| CN | 103776587 A | 5/2014 |
| DE | 1278140 B | 9/1968 |
| JP | 62223639 A | 10/1987 |
| JP | S62223639 A | 10/1987 |
| JP | 63196827 A | 8/1988 |
| JP | H01142429 A | 6/1989 |
| JP | H02186231 A | 7/1990 |
| JP | 2001083033 A | 3/2001 |
| JP | 2003214971 A | 7/2003 |
| JP | 2003302305 A | 10/2003 |
| JP | 2009216686 A | 9/2009 |
| JP | 2013024705 A | 2/2013 |
| WO | 9307458 A1 | 4/1993 |
| WO | 2005022107 A1 | 3/2005 |

OTHER PUBLICATIONS

Bao, Guohua, "Principle of measurement and metrological calibration about wheel dynamic balance", Shanghai measurement and testing, vol. 28, No. 5, Dec. 31, 2001 (Dec. 31, 2001), ISSN 1673-2235, pp. 16-20 (5 pgs.).

"Dynamic balance test method for motor vehicle tyres", Standards press of China GB/T18505-2001, Nov. 12, 2001 (Nov. 12, 2001) the whole document, 7 pgs.

International Search Report issued in corresponding international Application No. PCT/CN2014/091251, dated Feb. 17, 2015 (with English language translation) (6 pages).

Derek Norfield: "Runout Compensation" In: "Practical Balancing of Rotating Machinery", Jan. 1, 2006, Elsevier Science, Oxford, XP055399824, ISBN: 978-0-08-045938-7 pp. 199-202.

Extended European Search Report dated Aug. 31, 2017, in corresponding European Application No. 14880407.3; 14 pgs.

Japanese Office Action dated Jun. 6, 2017, in corresponding Japanese Application No. JP2016-565533; 6 pgs.

\* cited by examiner (a)  (b)

METHOD TO DETERMINE THE UNBALANCE OF A ROTOR

TECHNICAL FIELD OF THE INVENTION

This invention is related to a method to determine the unbalance of a rotor.

DESCRIPTION OF THE PRIOR ART

The current method for evaluating balancing machine and the unbalance of rotor is based on the current international standard (ISO2953:1999 Balancing Machines—Description and Evaluation), or the China National Stand (GB/T4201-2006—Description and Evaluation of Balancing Machines), or the method used by the balancing machine manufacturers, which is inherited from history. The terms used are Minimum Achievable Residual Unbalance (Umar), and Unbalance Reduction Ratio (Urr). These two terms have no clear and precise physical meaning. Using these two terms to evaluate balancing machine, the measured unbalance of a rotor by the balancing machine is a vector sum of the unbalance of the machine itself and the unbalance of the rotor. Neither the zero-unbalance point of the balancing machine is established, nor is the zero-unbalance rotor or a rotor with a definitive unbalance obtained. Traceability for the unbalance of a rotor measured on a balancing machine is not established.

When there is a doubt to the measured unbalance of a rotor, especially when the unbalances measured on two machines for the same rotor are different, there is no way to verify which unbalance is correct.

Hence, it is needed to invent a method to decouple the unbalance of the machine itself and the unbalance of the rotor, so as to make a zero-unbalance rotor, and to make a rotor with definitive unbalance, as well as to get a basic reference of a balancing machine: a zero-unbalance point of the balancing machine. By this method, the unbalance is related to the SI basic physical units, so as to achieve the traceability of unbalance measurement. This is important to the balancing machine manufacturers, machine users, and the certification organizations.

SUMMARY OF THE INVENTION

In view of the above mentioned technical problems, the object of this invention is to provide a method to determine the unbalance of a rotor. In order to reach this goal, Technical Solution 1 provides a method to determine the unbalance of a rotor, by decoupling the unbalance of the balancing machine itself and the unbalance of the rotor, with the unique character as reflected through the following procedures: First, make a zero angle reference on the rotor or on the balancing machine, select two planes on the rotor, and use the balancing machine to measure respectively the unbalances of the rotor in the two planes, these unbalances are designated as First Nominal Unbalances. The First Nominal Unbalance is a vector sum of the unbalance of the balancing machine and the unbalance of the rotor at the respective plane. Then, rotate the rotor a certain angle with respect to the balancing machine. When the zero angle reference is set on the rotor, remake the zero angle reference by rotating to the same angle in the direction opposite to the rotor's rotating direction; when the zero angle reference is on the balancing machine's drive system, the zero angle reference should be kept unchanged. Use the balancing machine to measure the unbalances of the rotor in the two selected planes, the unbalances measured are designated as Second Nominal Unbalances. The second nominal unbalance is a vector sum of the unbalance of the balancing machine itself and the unbalance of the rotor which is in the respective plane after the rotor being rotated to the certain angle. In the first nominal unbalance and the second nominal unbalance, the unbalance's amount and angle of the machine itself is the same, while the rotor's unbalance amount keeps the same, but the unbalance angle changes with the above rotated angle in the respective plane. Through vector calculation, the unbalance of the rotor can be determined.

This invention, by using the above method, decouples the unbalance of the balancing machine itself and the unbalance of the rotor, eliminates the influence of measuring the unbalance of the rotor which is produced by the machine unbalance itself, thus to get the unbalance of the rotor.

In Technical Solution 2, after getting the second nominal unbalance, the rotor is rotated relatively to the machine for multiple times, and corresponding measurements are taken for the multiple times; The unbalance of the rotor is determined through vector calculation of the measured unbalances.

Multiple measurements can ensure better accuracy of the unbalance of the rotor.

In Technical Solution 3 of this invention, 180° is taken as preferred rotating angle. Taking the first nominal unbalance vector and the second nominal unbalance vector as two sides to form a triangle, the median of the third side is the amount of the unbalance of the balancing machine, and its direction is pointing to the middle point of the triangle third side. The vector from the middle point of the triangle's third side to the end point of the first nominal unbalance is the unbalance of the rotor before being rotated to 180°; the vector from the middle point of the triangle's third side to the end point of the second nominal unbalance vector is the unbalance of the rotor after the rotor is rotated to 180°; these two unbalances have the same amount, but the opposite direction.

With this way, the rotor unbalances in the two selected planes can be easily obtained.

Technical Solution 4 of this invention provides a method to manufacture a rotor with zero unbalance or with unbalance smaller than a predetermined value. Using the method in Technical Solution 1 to get the unbalance of the rotor, then correct the unbalance of the rotor, until the rotor unbalance is zero or smaller than the predetermined value.

Thus, based on requirement, a rotor with zero unbalance or with unbalance smaller than a predetermined value is obtained.

Technical Solution 5 of this invention provides a method to manufacture a rotor with a definite unbalance. Make at least two mounting holes at position away from the rotational axis at the two selected planes on the rotor, and the holes' center line should be parallel with the rotor rotating axis. Using the method in Technical Solution 1 to obtain the unbalance of the rotor; correct the unbalance of the rotor and to make its unbalance to zero; then add one weight in the mounting hole on each of the two planes, and measure the unbalances of the rotor with mounting weights. Rotate the weights to at least two angles with respect to the mounting holes, and repeat the above measurements; when the unbalances measured are not the same, make eccentricity correction to the weights until the unbalances are the same, so as to this rotor has the definitive unbalance.

Add the weight into any rotor which is with zero unbalance, a rotor with definite unbalances is obtained.

Technical Solution 6 provides a method to determine the unbalance of a rotor, by decoupling the unbalance of the balancing machine and the unbalance of the rotor, including the following procedures: make a zero angle reference on the rotor or on the balancing machine, select one plane on the rotor, and use the balancing machine to measure the unbalance of the rotor in the plane, the unbalance is designated as First Nominal Unbalance. The First Nominal Unbalance is the vector sum of the unbalance of the balancing machine and the unbalance of the rotor in the plane. Then, rotate the rotor relatively to the balancing machine with a certain angle. When the zero angle reference point is set on the rotor, remake the zero angle reference point by rotating the same angle in the direction opposite to the rotor's rotating direction; when the zero angle reference point is on the balancing machine's drive system, the zero angle reference point should be kept unchanged. Use the balancing machine to measure the unbalance of the rotor in the selected plane, the unbalance measured are designated as Second Nominal Unbalance. The second nominal unbalance is a vector sum of the unbalance of the balancing machine itself and the unbalance of the rotor which is in the plane after the rotor being rotated to the certain angle. In the first nominal unbalance and the second nominal unbalance, the unbalance's amount and angle of the machine itself is the same, while the rotor's unbalance amount keeps the same, but the unbalance angle changes with the above rotated angle in the respective plane. By vector calculation, the unbalance of the rotor is determined.

Through selecting one plane to obtain the unbalance of a rotor, particularly when the rotor's axial length is very short with respect to the radius of the rotor, can efficiently determine the unbalance of the rotor and keep the measuring error in the range.

Technical Solution 7 of this invention provides a method to determine the unbalance of the balancing machine itself, by decoupling the unbalance of the balancing machine and the unbalance of the rotor, with the following procedures: make a zero angle reference on the rotor or on the balancing machine, select two planes on the rotor, and use the balancing machine to measure the unbalances of the rotor in the two planes; these unbalances are designated as First Nominal Unbalances. The First Nominal Unbalance is the vector sum of the unbalance of the balancing machine and the unbalance of the rotor at the respective plane. Then, rotate the rotor relatively to the balancing machine with a certain angle. When the zero angle reference point is set on the rotor, remake the zero angle reference point by rotating to the same angle in the direction opposite to the rotor's rotating direction; when the zero angle reference is on the balancing machine's drive system, the zero angle reference should be kept unchanged. Use the balancing machine to measure the unbalances of the rotor in the two selected planes, the unbalances measured are noted as Second Nominal Unbalances. The second nominal unbalance is the vector sum of the unbalance of the balancing machine itself and the unbalance of the rotor which is in the respective plane after the rotor being rotated to the certain angle. In the first nominal unbalance and the second nominal unbalance, the unbalance's amount and angle of the machine itself is the same, while the rotor's unbalance amount keeps the same, but the unbalance angle changes with the above rotated angle in the respective plane. By vector calculation, the unbalance of the balancing machine is determined.

By above method of decoupling the machine's unbalance and the rotor unbalance to obtain the unbalance of the balancing machine itself, the problem that the unbalance of the balancing machine itself is not known is resolved and the machine's unbalance influence to the unbalance measurement is eliminated.

Technical Solution 8 of this invention provides a method to make the balancing machine's unbalance to zero or smaller than a predetermined value. Use the method described in Technical Solution 7 to get the unbalance of the machine itself, then to correct the unbalance of the machine, or take an electrical compensation for the unbalance, to make the machine's unbalance to zero or smaller than a predetermined value.

And this can improve the measuring accuracy of the machine according to requirement.

Technical Solution 9 of this invention provides a method of making the unbalance of the machine itself to zero, or smaller than a predetermined value. Use the method described in Technical Solution 4 to make a rotor with zero unbalance; Use the machine which needs to be adjusted to measure the unbalance of the rotor which is zero unbalance, the measured unbalance value is the unbalance of the machine itself; Correct the unbalance of the machine or take an electrical compensation for the unbalance, to make the machine unbalance to zero or smaller than a predetermined value.

This technical solution provides another method to make the unbalance of the machine itself to zero or smaller than a predetermined value. This method is simple and practical.

DESCRIPTION OF EMBODIMENTS

An embodiment according to the invention will be illustrated hereinafter with reference to the drawings. For easier explanation, the embodiment steps are described basically in the order of the realization of this invention, but some sections are not necessarily sequential, and the following procedure is not unique. The procedure is for illustrative purpose, not all the steps are necessary, as long as the invention can be realized with the steps. The method and procedure described in this part do not in any way limit the protection scope of this invention.

Figure 1:
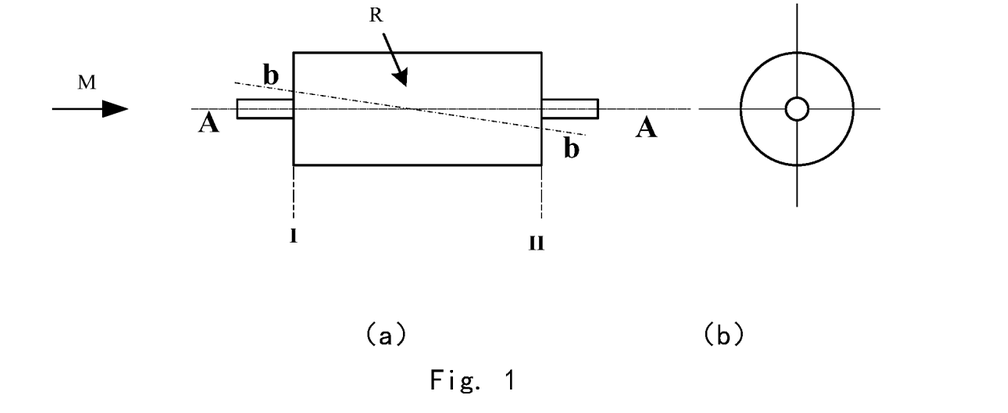
FIG. 1 shows a rotor; the rotor's mass axis is not in the same line with its rotational axis, (a) is the front view of the rotor, (b) is the view from M direction.

A. As shown by FIG. 1, for a given rotor R, when its mass distribution, i.e. its mass axis b-b is not in the same line as the rotating axis A-A, this rotor R possesses unbalance. The unbalance of a rotor R can be presented by the unbalances in any two selected planes on the rotor. Particularly when the axial length of the rotor R is very short with respect to the radius, the unbalance can also be approximatively presented in one plane. Of course, the unbalance of a rotor can also be presented by three or more unbalances (corresponding to planes) in three or more planes. Unbalance is a vector with amount and angle. The unbalance of the rotor R is measured by a balancing machine.

Figure 2:
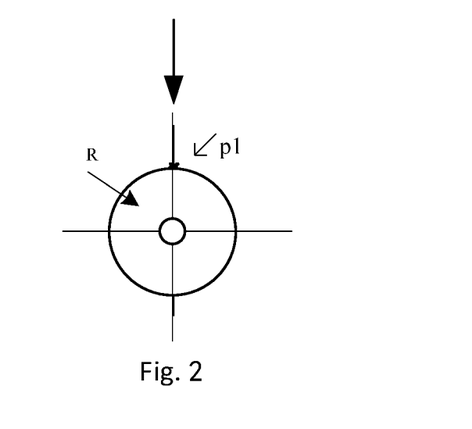
FIG. 2 shows the zero angle reference on the rotor.

B. The angle of the unbalance is measured by an angle sensor on the balancing machine, and by the zero angle reference mark on the rotor R. The angle of unbalance is counting from the zero angle reference mark P1. The angle sensor of balancing machine is mounted at a fixed position on the outside of the rotor R, for easier illustration, the angle sensor is placed right above the P1, as seen in FIG. 2.

Figure 3:
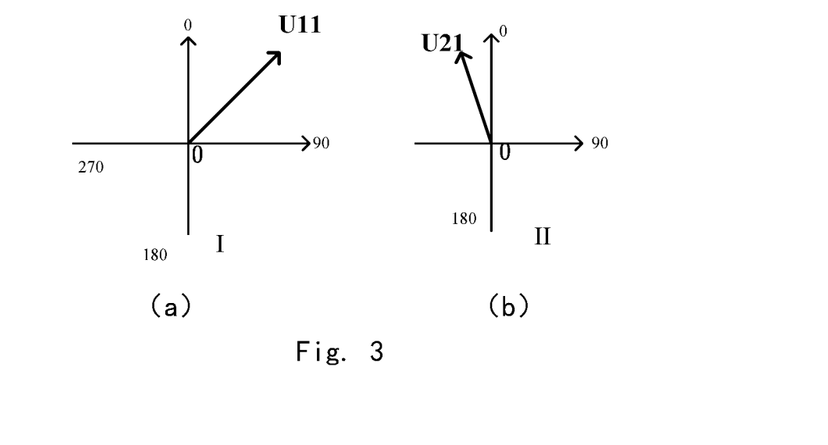
FIG. 3 shows the unbalances (amounts and angles) measured on a balancing machine, (a) is the unbalance in plane I, and (b) is the unbalance in plane II.

C. Using a balancing machine to measure the unbalance of rotor R shown in FIG. 1. In this embodiment, the rotor is placed on the balancing machine by the supporting way of horizontal type. Certainly, the supporting method is not limited, for example, the rotor can also be placed on the balancing machine by the supporting way of vertical type. When measuring the unbalance, in order to get a higher precision, the unbalance of the rotor R can be measured for multiple times, and taking the vector average value of multi-measurements as the measured unbalance of the rotor R. The measured value on the balancing machine in plane I is designated as U11 (First Nominal Unbalance, including amount and angle) and the value in Plane II is designated as U21 (First Nominal Unbalance, including amount and angle). The measured unbalance is presented by U11 and U21. Plot the first nominal unbalance on the coordinate. The origin of the coordinate is the zero unbalance point, 0 degree of the coordinate is the zero angle reference on the rotor (as seen in FIG. 3).

D. Rotate the rotor R with 180 degrees about its rotational axis with respect to the balancing machine (rotor R relative to the support and drive of the balancing machine). Now the zero angle reference P1 on rotor R goes to the bottom position, as seen in FIG. 4 (a).

The way of rotating the rotor R with 180 degrees with respect to the balancing machine, includes but not is limited to these cases: roller support and roller drive, roller support and belt drive, air bearing support and air drive, sleeve bearing support and propeller shaft drive through rotating the two ends of the shaft connection, or unclamp the fixture and rotate the rotor R when the rotor R is clamped by fixture, or use bush on the support journal to rotate.

The angle with respect to the balancing machine to be rotated can be 180 degrees, or other amount of degrees.

Figure 4:
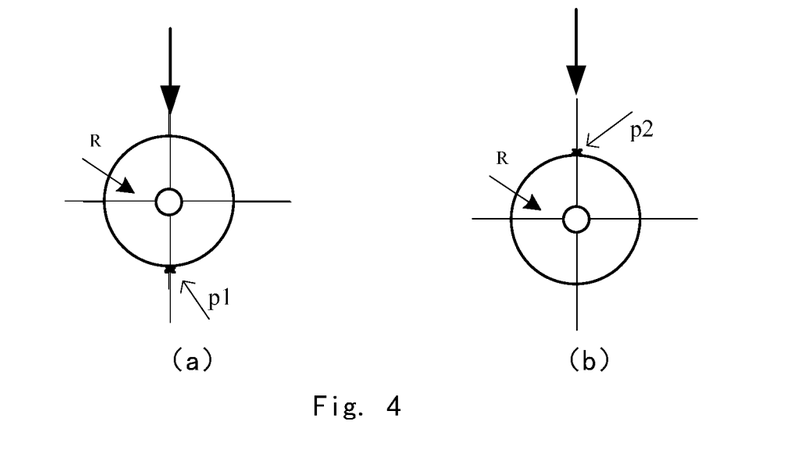
FIG. 4 shows the remaking zero angle reference on the rotor, (a) shows the zero angle reference at the bottom of the rotor after the rotor being rotated 180 degrees with respective to the balancing machine, (b) shows that the new zero angle reference is re-made at the top of the rotor.

Remake the zero angle reference point by rotating the same angle along the direction opposite to the rotor's rotating direction, i.e. remove the reference P1 from the rotor R, and remake the new reference P2 at the position symmetric to P1 in reference to the rotational axis, i.e. right above of the rotor R (at the original position of reference P1 before the rotor is rotated, as seen in the FIG. 4 (b)).

In reference to the new zero angle reference P2, the amount of unbalance of rotor R is not changed, but the angle of unbalance is changed by 180 degrees. The unbalance of the balancing machine itself in reference to the new zero angle reference P2 is not changed in amount and angle.

The zero angle reference point is marked by reflective adhesive tape or fluorescent paint in most cases, the unbalance generated by which can be neglected. In order to completely eliminate the unbalance caused by the reference point mark, an object with the same mass as the reference point mark can be adhered to the symmetric position of the reference point mark with respect to the rotational axis.

When the zero angle reference point is not made on the rotor but on the driving system of the balancing machine, the zero reference needs no change when rotating the rotor R with respect to the balancing machine.

Figure 5:
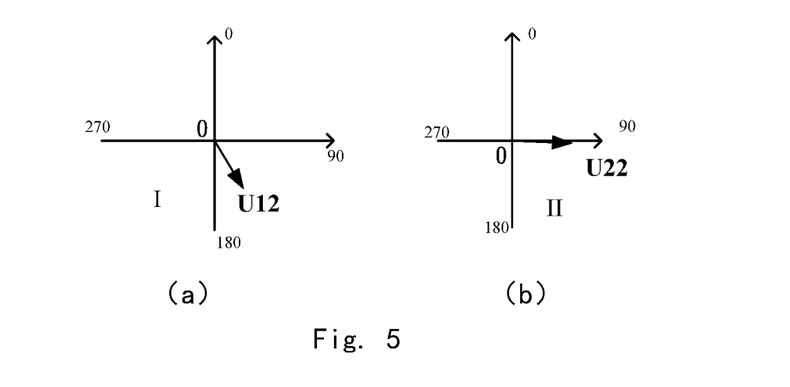
FIG. 5 illustrates the second measurement of unbalance of the rotor on the machine, (a) is the unbalance in plane I, and (b) is the unbalance in plane II.

E. Measure the unbalance of the rotor R the second time. The value measured on the balancing machine in plane I is designated as U12 (Second Nominal Unbalance, including amount and angle) and the value in Plane II is designated as U22 (Second Nominal Unbalance, including amount and angle). Plot the second nominal unbalance on the coordinate, as seen in FIG. 5.

Figure 6:
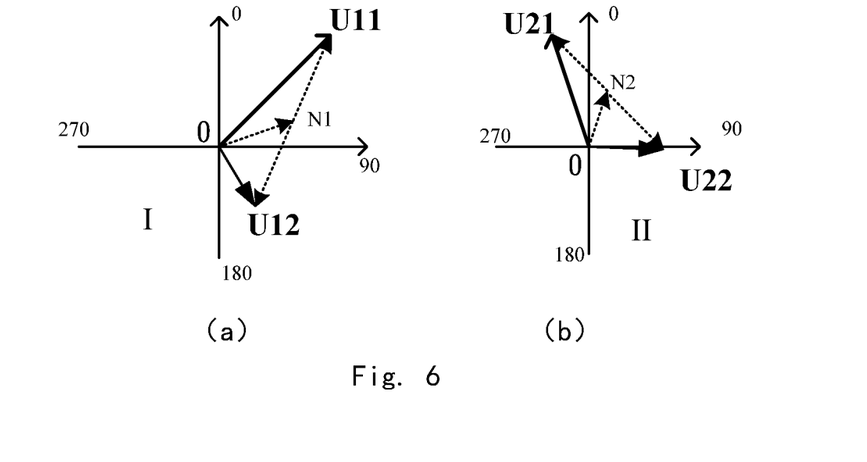
FIG. 6 illustrates the calculation of the unbalance of the machine itself and the unbalance of the rotor using the first nominal unbalance and the second nominal unbalance, (a) shows the unbalance in plane I, and (b) shows the unbalance in plane II.

Refer to FIG. 6, Take the first time unbalances and the second time unbalances as two triangle sides, the middle points of the third sides of the two triangles are designated as N1 in plane I and N2 in plane II.

Figure 7:
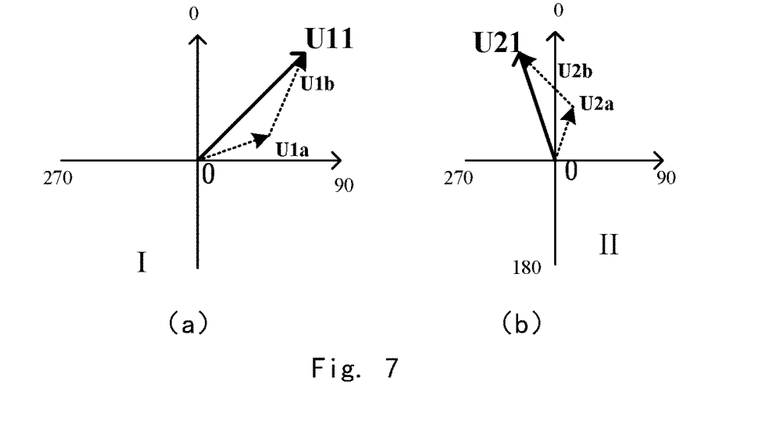
FIG. 7 illustrates the calculation of the unbalance of the machine itself and the unbalance of the rotor using the first nominal unbalance and the second nominal unbalance, (a) shows the unbalance in plane I, and 1(*b*) shows the unbalance in plane II.

Draw two medians with N1 and N2 (vector directions are pointing to the middle points), vector U1a (the unbalance of the balancing machine itself) and vector U2a (the unbalance of the balancing machine itself) are obtained, Draw vector from N1 and N2 to the vector end of U11 and U21, then the vector U1b (unbalance of rotor R) and U2b (unbalance of rotor R) are obtained, as seen in FIG. 7.

According to vector calculation, it can be gained that: In plane I, the first nominal unbalance U11 is the vector sum of unbalance of the machine itself U1a and the unbalance of the rotor R's U1b; in plane II, the first nominal unbalance U21 is the vector sum of unbalance of the machine itself U2a and the unbalance of the rotor R's U2b, as seen in FIG. 7.

Figure 8:
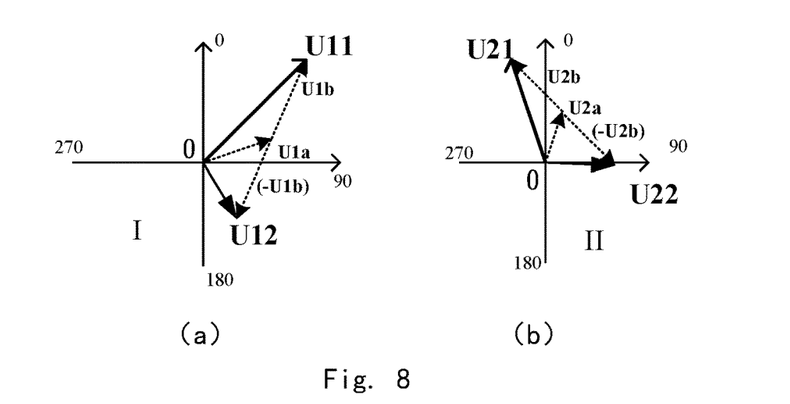
FIG. 8 illustrates the calculation of the unbalance of the machine itself and the unbalance of the rotor using the first nominal unbalance and the second nominal unbalance, (a) shows the unbalance in plane I, and 1(*b*) shows the unbalance in plane II.

F. Referring to FIG. 8, of the unbalances measured in above step E, the unbalance with amount and angle of the balancing machine itself doesn't change; but the unbalance of the rotor R measured in step E in comparison with the unbalance measured in step C, the amount keeps unchanged, its angle changes 180 degrees. To change the unbalance of rotor R in plane I and plane II in 180 degrees and keep the amount unchanged, and they are designated as −U1b and −U2b. In step E, the second nominal unbalance U12 in plane I is the vector sum of unbalance of the machine itself U1a and the unbalance $-U1b$ of the rotor R; in plane II, the second nominal unbalance U22 is the vector sum of unbalance of the machine itself U2a and the unbalance $-U2b$ of the rotor R.

G. By the two times of measurements in above step C and step E and by the vector calculation, in plane I the unbalance U1b of rotor R and the unbalance U1a of the machine itself are obtained; in plane II, the unbalance U2b of rotor R and the unbalance U2a of the machine itself are obtained.

By above procedure, the unbalances of rotor R in the two plane and the unbalance of the machine itself have been determined. In order to make a zero unbalance rotor, the following procedure H needs to be carried out.

In above embodiment, after obtaining the first nominal unbalances, the rotor is rotated only one angle, and then gained the second nominal unbalances; and based on measurements of these two times, the unbalance of rotor R in the two planes and the unbalance of the machine itself are calculated. But this invention doesn't limit the measurements with only two times. One time or more times of rotor rotations and measurements can be carried out and the unbalance of rotor R and the unbalance of the machine itself can be calculated based on the measured value of the multiple measurements.

Figure 9:
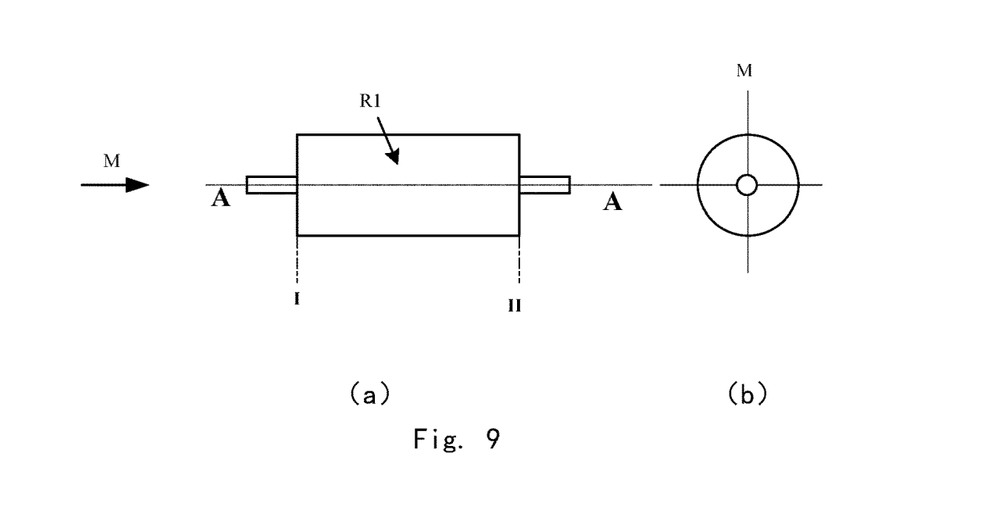
FIG. 9 shows a rotor with zero unbalance, (a) is the front view of the rotor; (b) is the view from M direction of the rotor.
Figure 10:
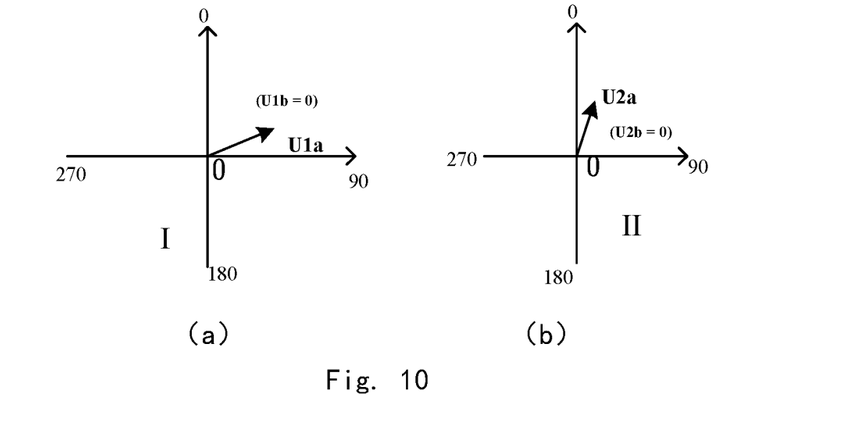
FIG. 10 shows the rotor with zero unbalance, only the unbalance of the machine itself is remaining, (a) is the unbalance in plane I, (b) is the unbalance in plane II.

H. Make precise correction to the unbalance U1b and U2b of rotor R, until the unbalances are zero (or smaller than a predetermined value). Then the rotor with zero unbalance (or smaller than a predetermined value) is gained. As seen in FIG. 9 and FIG. 10.

To the unbalances of the machine itself U1a and U2a, make precise correction mechanically or make electrical compensation, to let the unbalance of the machine itself U1a and U2a to be zero; Thus the zero unbalance point of the balancing machine is obtained, as seen in FIG. 11.

The zero unbalance point of the balancing machine, can also be achieved by using the zero unbalance rotor R1, and by taking the following procedure I, in which the unbalance of the balancing machine is directly measured.

I. Put the zero unbalance rotor R1 on the balancing machine, repeat the procedure C and procedure E. Since rotor R1 has zero unbalance, the two unbalances in plane I are the same, the two unbalances in plane II are the same, i.e., the unbalance measured on plane I is U1a, and in plane II is U2a, as seen in FIG. 10.

Figure 11:
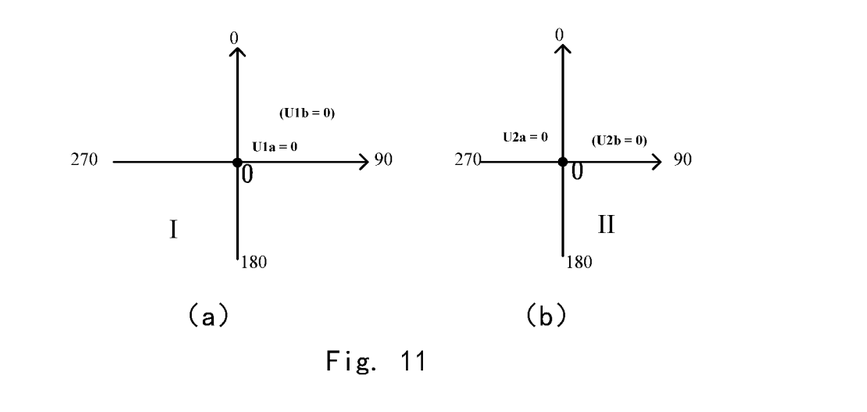
FIG. 11 shows the unbalance of the machine itself is zero, (a) is the unbalance in plane I, and (b) is the unbalance in plane II.

Take precise correction to unbalance U1a and U2a mechanically, or use electrical compensation, to make the unbalance U1a and U2a of the machine itself to zero, then the zero unbalance point of the machine is gained. as seen in FIG. 11.

Further, using the following method of this invention, mass weights which can generate definite unbalance can be made, and rotor which possesses definite unbalance can be made.

Figure 12:
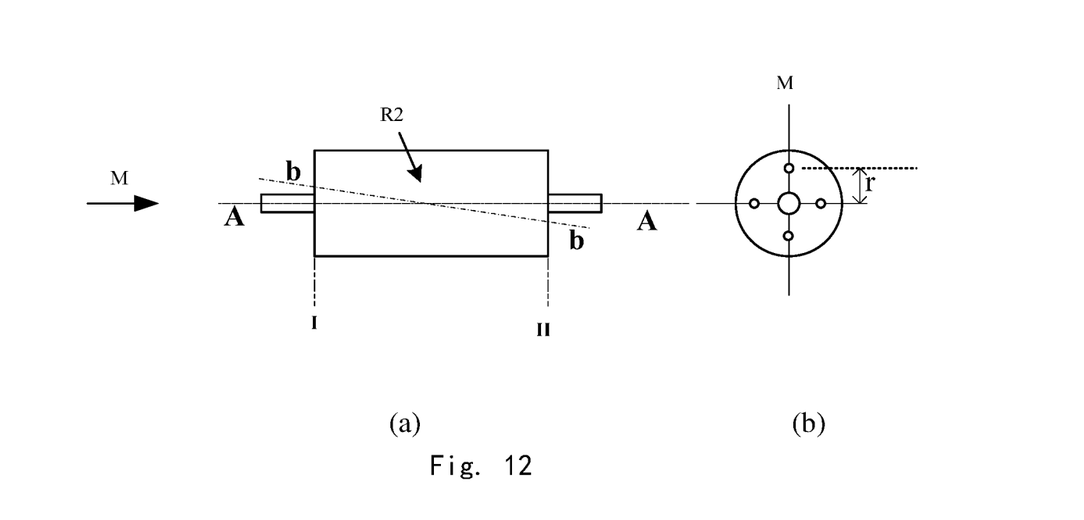
FIG. 12 illustrates a rotor with zero unbalance and with holes for mounting weights, (a) is the front view of the rotor, and (b) is the view from M direction of the rotor.

J. On the two end surfaces of rotor R1 (the two surfaces are perpendicular to the rotational axis A-A) at the radius r, symmetrically to the rotational axis, precisely machining 4 mounting holes which are with the same distance between two holes, for mounting the mass weights, as shown in FIG. 12. When machining the mounting holes, there is no specific limitation to the number of holes. It can be two holes (one hole at one end surface) or more.

Make balance measurement and correction to this R1 according to above procedure C and procedure H, to make the unbalances of rotor R1 in plane I and plane II are zero. This rotor with mounting holes and with zero unbalance is designated as rotor R2. As seen in FIG. 12.

Figure 13:
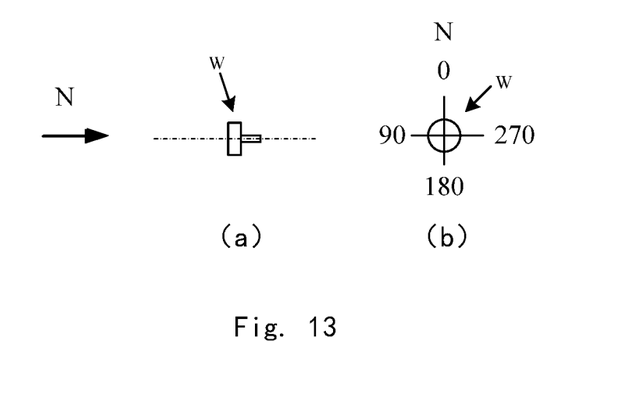
FIG. 13 shows the mass weights, (a) is the side view, and (b) is the view of N direction.

K. Manufacture two mass weights as shown in FIG. 13 (mass weight W). The weights are designated as W1 and W2 respectively. At the end surface of the weight, make four angle marks 0, 90, 180, 270.

Figure 14:
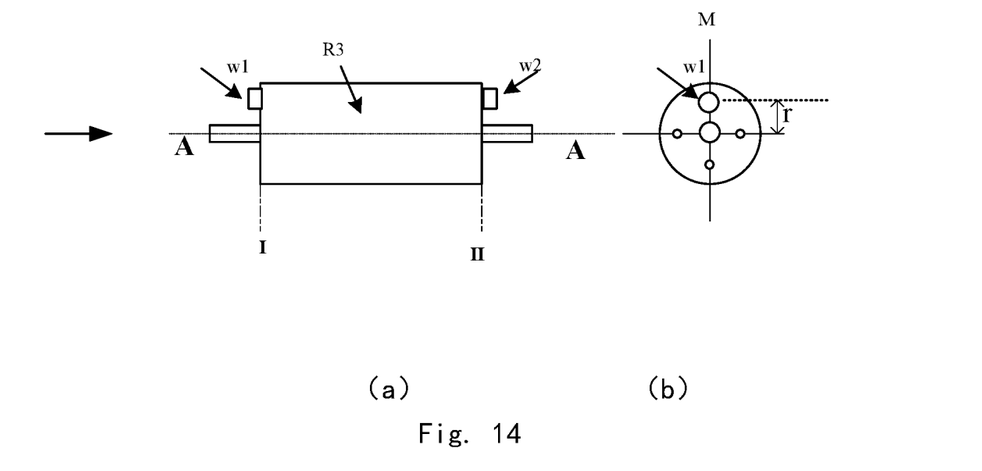
FIG. 14 shows a rotor with definite unbalance, (a) is the front view, and (b) is the view from M direction.

Insert the mass weights W1 and W2 with the 0 degree at up position into the top mounting hole in plane I and plane II on the zero unbalance rotor R2 as shown on FIG. 12 (Refer to FIG. 14).

Measure the unbalance of rotor with the mounted mass weights, the unbalance in plane I is designated as U11 and the unbalance in plane II is designated as U21; Take the mass weights out of the holes on the rotor, and rotate the mass weights W1 and W2 with 180 degrees clockwise with respect to the first mounting posture, then insert weights W1 and W2 into the same mounting holes again; Measure the unbalance of the rotor with the mass weights the second time, the unbalance is designated as U12 and U22 respectively in plane I and plane II. When making the unbalance measurement, more measuring can be taken in each procedure and use the average value of the multiple measurements as the unbalance measurement value, in order to achieve higher precision.

If the amounts or angles of U11 and U12 are not the same, it means that the mass center of the mass weight W1 is not in the middle axis of the mass weight. Using the unbalance value U11, U12 to calculate the unbalance of mass weight W1 and make eccentricity correction to W1. For mass weight W2, carry out the same procedure according to the unbalance value U21 and U22.

L. Repeat the procedure K, if U11 and U12 are the same (or smaller than a predetermined value). This means that the mass center of the weight is in the middle axis (or deviates in a predetermined value). For mass weight W2, carry out the same procedure.

M. Weigh the mass of W1 and W2 after procedure L, and designate them as m1 and m2.

N. Mount mass weights W1 and W2 made by procedure J to M, to the holes at the top positions of the radius r of plane I and plane II of rotor R2, which is a zero unbalance rotor made by procedure J. The rotor with mass weights W1 and W2 is now designated as R3. In plane I of rotor R3, there is a definite unbalance, the amount is m1*r, and angle is 0 degree; In plane II of rotor R3, there is a definite unbalance, the amount is m2*r, and angle is 0 degree. Thus, the rotor R3 with definite unbalances is obtained, as shown in FIG. 14. m1 and m2 are with mass unit (kg), r is with length unit (m), angle is with unit radian (rad). The unbalance amount and angle generated by mass weights W1 and W2, or the definite values of unbalance of rotor R3, are related to the International System of Base Units (mass kg and length m), and International System of Auxiliary Units (plane angle radian rad). Thus the traceability of unbalance is established.

In above embodiment, the mass weights are inserted into the holes at the top positions in plane I and plane II of rotor R2, in practice W1 and W2 can be inserted into other holes other than the hole at the top positions.

By this invention, and using the prior art, the following purpose can also be achieved:

O. Balancing machine calibration: Use zero unbalance rotor R2 made by procedure J, and rotor R3 made by procedure N which possesses definite unbalance, calibrate the zero unbalance point and a definite unbalance at the balancing machine, to reach the purpose of calibrating the balancing machine.

P. Balancing machine verification: Use zero unbalance rotor R2 made by procedure J, and the R3 made by procedure N which possesses definite unbalance, check any balancing machine, and compare the deviation of the readings with the zero unbalance and the known definite unbalance, so as to verify whether the balancing machine is accurate.

Q. Manufacture different precision level zero unbalance rotor (or rotor with definite unbalance): by procedure J to make the most precision zero unbalance rotor R2 and make the most precision rotor R3 with definite unbalance, carry out procedure O to calibrate the balancing machine, and make procedure P to re-check the balancing machine, and then manufacture new zero unbalance rotor Ra on the machine, or manufacture rotor Rb which is with definite unbalance, by this way, another quality level of zero unbalance rotor Ra, or rotor Rb which possesses definite unbalance is obtained.

The above detailed explanation and procedure is an exemplified embodiment for realizing this invention. But the realization method of this invention is not limited to above illustrated methods and procedures. Alternative solutions in the realization method and procedures based on the concept and principle of this invention exist and are covered by this invention.

What is claimed is:

1. A method to determine an unbalance of a rotor, by decoupling an unbalance of a balancing machine itself and the unbalance of a rotor, comprising:

making a zero angle reference on the rotor, selecting two planes on the rotor, and using the balancing machine to measure respectively the unbalances of the rotor in the two planes, the measured unbalances are designated as a first nominal unbalance; the first nominal unbalance is a vector sum of the unbalance of the balancing machine and the unbalance of the rotor at the respective plane;

rotating the rotor a certain angle with respect to the balancing machine; the way of rotating the rotor with respect to the balancing machine including the cases of roller support and roller drive, roller support and belt drive, and air bearing support and air drive; removing the zero angle reference from the rotor, remaking a new zero angle reference on the rotor; the new zero angle reference on the rotor being spaced apart from the removed zero angle reference by the rotated certain angle in a direction opposite a direction of rotation of the rotor;

using the balancing machine to measure the unbalances of the rotor in the two selected planes, the unbalances measured are designated as a second nominal unbalance; the second nominal unbalance is a vector sum of the unbalance of the balancing machine itself and the unbalance of the rotor which is in the respective plane after being rotated to the certain angle; in the first nominal unbalance and the second nominal unbalance, the unbalance of the balancing machine itself in both of amount and angle is the same, while the rotor's unbalance in amount keeps the same, but the unbalance angle changes with the rotated certain angle; and determining the unbalance of the rotor through vector calculation.

2. A method to make a rotor with zero unbalance or with unbalance smaller than a predetermined value, comprising:

using the method in claim 1 to obtain the unbalance of the rotor; and then correcting the unbalance of the rotor, until the unbalance is zero or smaller than the predetermined value.

3. A method to make a rotor with definitive unbalance, comprising:

making at least two mounting holes away from a rotational axis at the two selected planes on the rotor; the holes' center line is parallel to the rotational axis of the rotor; using the method in claim 1 to determine the unbalance of the rotor;

correcting the unbalance of the rotor and make the unbalance of the rotor to zero;

adding one mass weight in the mounting hole on each of the two planes, and measure the unbalances of the rotor with the mounted mass weights;

rotating the mass weights with respect to the mounting holes to at least two angles, and measuring the unbalances of the rotor with the mounted mass weights; and when the unbalances measured are not the same, making eccentricity correction to the mass weights until the unbalance measurements are the same; by doing this, the rotor with definitive unbalance is obtained.

4. A method according to claim 1, wherein further selecting one measuring plane on the rotor instead of two measuring planes.

5. A method according to claim 1, wherein the unbalance of a balancing machine is measured and calculated instead of the unbalance of the rotor.

* * * * *